Feb. 25, 1969   G. S. NALLE, JR   3,429,004
APPARATUS FOR EXTRUDING PLASTIC RUGS
Original Filed Feb. 25, 1964   Sheet 2 of 4

INVENTOR
George S. Nalle, Jr.
BY Arnold, Roylance, Kruger & Durkee
ATTORNEYS

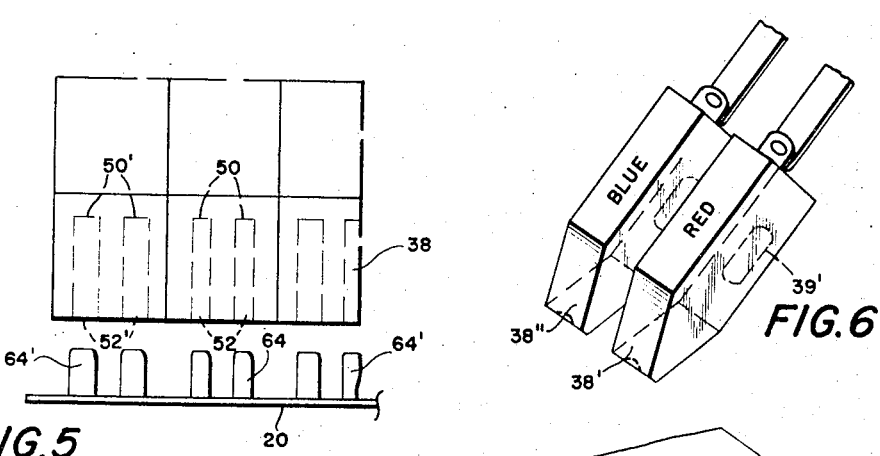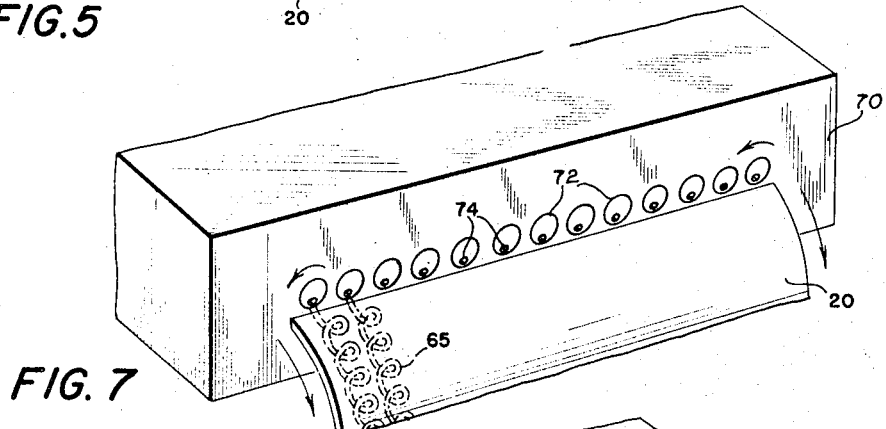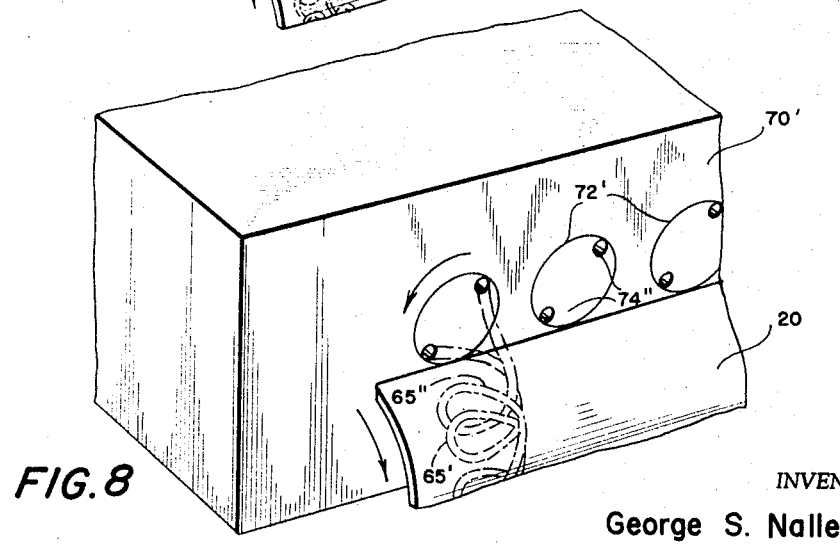

United States Patent Office 3,429,004
Patented Feb. 25, 1969

3,429,004
APPARATUS FOR EXTRUDING PLASTIC RUGS
George S. Nalle, Jr., 108 W. 2nd St., Austin, Tex. 78701
Original application Feb. 25, 1964, Ser. No. 347,316, now Patent No. 3,382,122, dated May 7, 1968. Divided and this application Mar. 27, 1968, Ser. No. 716,481
U.S. Cl. 18—13                                    16 Claims
Int. Cl. B29f 3/00

ABSTRACT OF THE DISCLOSURE

An apparatus for extruding plastic rugs simultaneously extrudes a base sheet of plastic material and extrudes a series of filaments which are intermittently contacted with the sheet to create a pile effect on the sheet. The filaments can be intermittently contacted with the sheet by various techniques such as by reciprocating motion or by rotating motion.

---

This application is a divisional application of copending application Ser. No. 347,316 filed Feb. 25, 1964 in the name of George S. Nalle, Jr. as inventor entitled "Method and Apparatus for Extruding Plastic Rugs," issued May 7, 1968 as U.S. Patent 3,382,122. Accordingly, this application claims priority based upon said prior application Ser. No. 347,316.

This invention relates to an apparatus for extruding plastic rugs, and in particular to an apparatus for extruding a mesh pile fabric from plastic materials such as resinous plastics, plastic metals and cermets. By the apparatus disclosed herein, it is possible to produce a plastic loop of netting anchored to a base such as a plastic film, plastic sheet, paper, fabric, foamed elastomer or plastic netting. In particular, a sheet of plastic material of either uniform or varying thickness is extruded while a reciprocating or rotating orifice of hot plastic is moved in such a manner as to produce a loop or thread which is bonded to the plastic sheet. By varying the rate at which the thread or filaments of the loop are extruded, it is possible to produce loops of the desired density. The invention also enables the loops or threads to be extruded from a different material than that from which the sheet base is made. In this manner, the loops or threads can be made of a material having good abrasive characteristics while the sheet base material can be made of another plastic having different characteristics such as flexibility, good welding characteristics or low price. It is also possible to vary the colors of the threads, thus providing the desired ornamental effect.

The simplicity of mechanical construction of the invention, as well as the unique characteristic of producing loops which are bonded to a sheet material or base, is believed to be an important improvement over the apparatus of my U.S. Patent No. 3,012,275 dated Dec. 12, 1961.

Accordingly, it is an object of the present invention to provide a method for forming rugs consisting of loops of plastic netting which are anchored to a base material.

Another object of invention is to provide a suggested apparatus for forming extruded plastic rugs consisting of loops of plastic thread which are bonded to a plastic base material and in which the density of the loops and the thickness of the base material may be varied.

Still a further object of invention is to provide a suggested apparatus for producing plastic rugs consisting of loops of plastic thread which are anchored to a plastic base material, and in which the loops of plastic thread may vary in color.

Other and additional objects of invention will become apparent from the ensuing specification and attached drawings which illustrate the suggested device for performing the present method, and wherein:

FIGURE 4 is a part of a vertical section view showing a modified construction designed to extrude the loops of the rug from a different material than that from which the base of the rug is made;

FIGURE 5 is a partial sectional view showing a modified die construction designed to extrude loops of varying size;

FIGURE 6 is a perspective view of another modified die structure designed to extrude loops of different colors;

FIGURE 7 illustrates schematically in perspective a further modification involving the extrusion of filaments with the use of rotating die plugs;

FIGURE 8 is a perspective view similar to FIGURE 7 showing a modified rotating die using a plurality of extrusion orifices.

Figure 1:
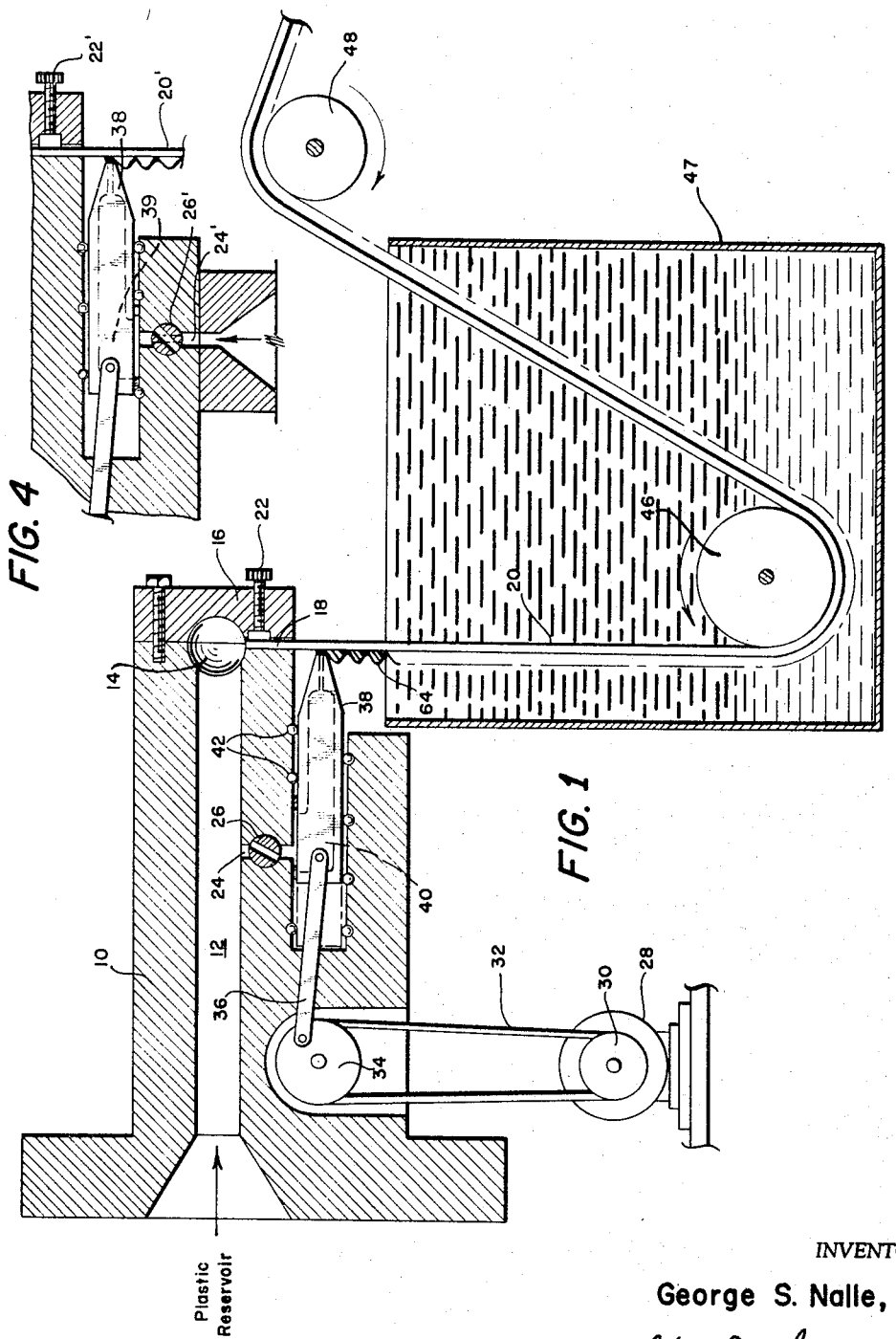
FIGURE 1 is a vertical sectional view of a preferred embodiment of a suggested die head assembly.
Figure 2:
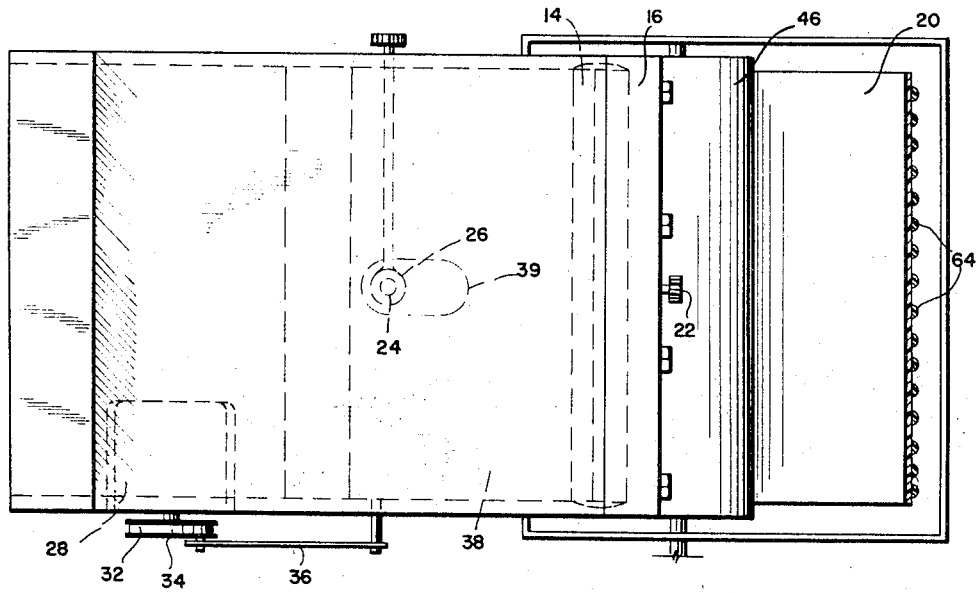
FIGURE 2 is a top plan view of the preferred embodiment of FIGURE 1.
Figure 3:
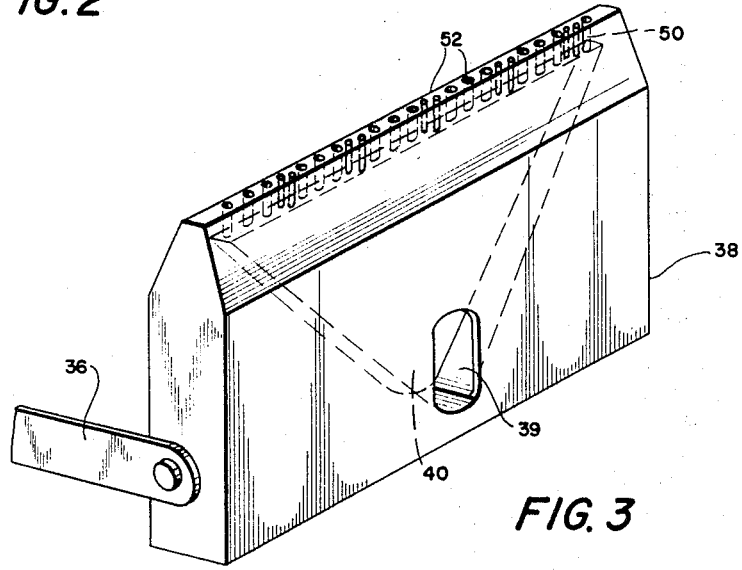
FIGURE 3 is a perspective view showing the reciprocating piston of the preferred embodiment of the invention as shown in FIGURES 1 and 2.

Referring particularly to FIGURES 1, 2, and 3, the suggested apparatus for extruding the rugs consists of a die head 10 containing a supply conduit 12 for liquid plastic which terminates in discharge conduit 14 having an elongated extrusion orifice 18 regulated by variable choke 22. The supply system for the plastic materials is not shown, the means for delivering such material to dies is old in the art and hence does not require illustration.

Below die head 10 is located pile extruding piston 38 supported for longitudinal movement by die bearing 42 and caused to reciprocate by mounting rod 36 which is eccentrically attached to cam 34. Movement is imparted to cam 34 by drive belt 32 which is driven by motor 28 through pulley 30. The liquid plastic is supplied to supply chamber 40 of extruding piston 38 from supply conduit 12 via conduit 24 and valve 26. As seen in FIGURE 3, the top of piston 38 is provided with opening 39 providing communication to chamber 40. As also seen in FIGURE 3, the pile extruding piston 38 terminates in a plurality of ports 50 having individual extrusion orifices 52. Communication to the individual ports 50 and extrusion orifices 42 from opening 39 is afforded by means of main conduit 40.

In operation, the rotation of cam 34 imparts a reciprocating movement to pile extruding piston 38 which results in the loops of thread or filaments 64 being bonded to the sheet of base material 20 so as to produce a mesh pile fabric. As indicated before, a high density of loops 64 can be obtained merely by extruding the loops or filaments 64 at a rapid rate and/or extruding the base material at a slower rate. Finally, the finished rug is conveyed by rollers 46 and 48 through bath 47.

A second embodiment of applicant's invention is illustrated in FIGURE 4 wherein liquid plastic is supplied to extruding piston 38 from a different source of plastic from that being supplied to conduit 12. In that embodiment plastic is supplied to chamber 40 of piston 38 through conduit 24' and valve 26' which are located within that portion of die head 10 lying below piston 38. For this embodiment, opening 39 is located on the bottom of piston 38. Thus, a plastic having different characteristics from that used to form the base 20 of the rug is transmitted to extruding piston 38. As pointed out before, while the loops or threads 64 of the rug are usually made of a material having good abrasive characteristics, it is frequently desirable to make the base 20 of the rug of a material having different characteristics such as flexibility, good welding characteristics, or low cost.

A third embodiment of applicant's invention is illustrated in FIGURE 6 wherein extruding piston 38 is in the form of a plurality of smaller pistons 38', 38", each of which extrudes threads of different color so as to provide ornamental effect if desired. The system for supplying plastic to each of the individual pistons is not known, but, the means for delivering such material is substantially the same as that disclosed with regard to the second embodiment of the present invention as illustrated in FIGURE 4.

A fourth embodiment of applicant's invention is illustrated in FIGURE 5 wherein the sizes of ports 50 and extrusion orifices 52 vary so as to produce a "rib-like" effect. As seen in FIGURE 5, ports 50' and extrusion orifices 52" are larger than ports 50 and orifices 52' respectively, thus producing loops 64' on base 20 which are larger than loops 64.

A fifth embodiment of applicant's invention is illustrated in FIGURE 7 wherein the filaments are in the shape of coils and applied to the base material 20 with the use of rotating plugs 72. Shown schematically, this embodiment consists of a die head 70 containing rotating extrusion plugs 72 having individual orifices 74. As the sheet of base material 20 emerges from the die head 70, the "coiled" filaments 65 are bonded to the base material 20.

A sixth embodiment of applicant's invention is illustrated in FIGURE 8 wherein each of the rotating plugs 72' has a plurality of orifices 74". As the base material 20 emerges from die head 70', a plurality of coiled filaments 65', 65" are welded upon the surface of base material 20 of the rug. Rotating plugs 74 may also be located under base material 20. It is also understood that both base material 20 and filaments 65 may be extruded vertically downward or at some angle with respect to the pull of gravity.

Figure 9:
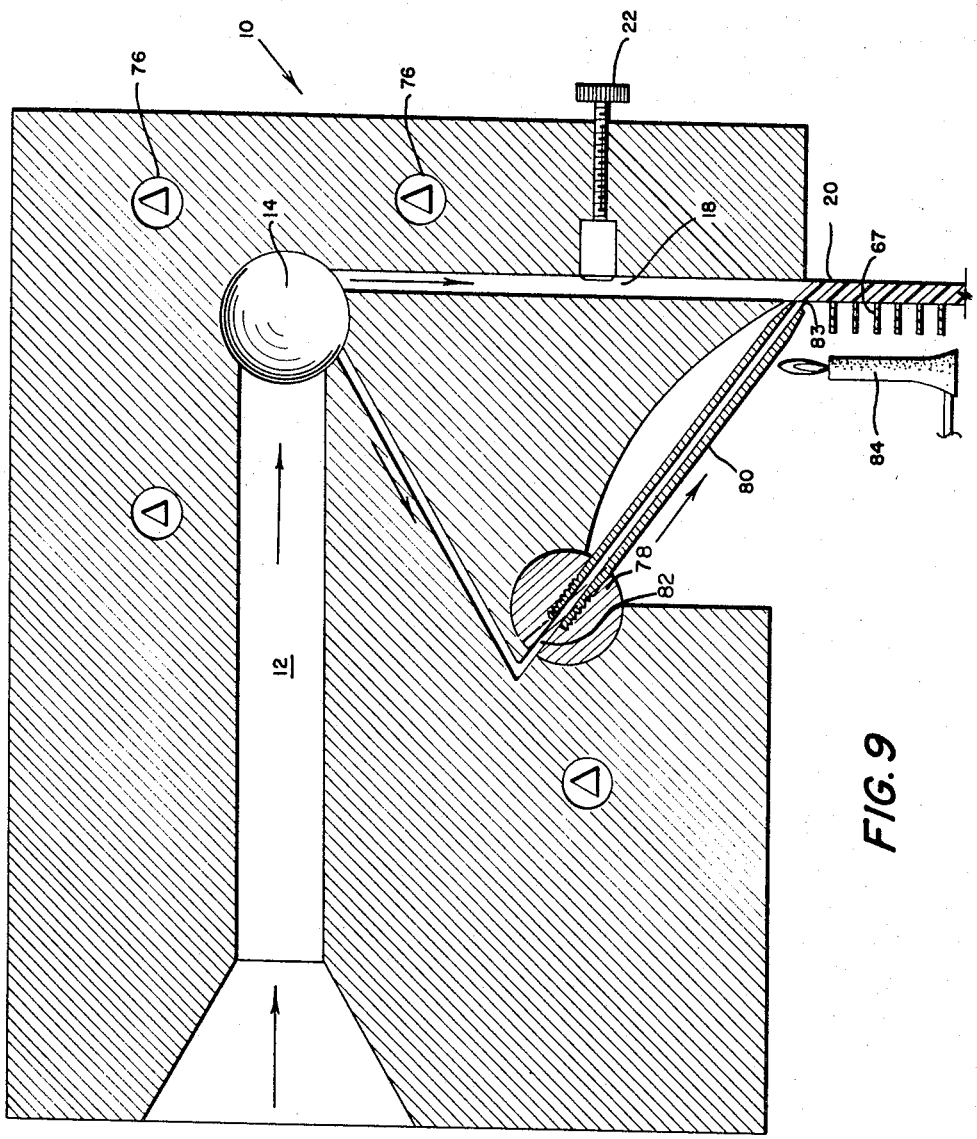
FIGURE 9 is a vertical sectional view showing a still further modification involving the use of an oscillating extrusion piston or rod.

A seventh embodiment of applicant's invention is illustrated in FIGURE 9, wherein liquid plastic is supplied to an oscillating rod 78 from supply conduit 12 located within die head 10. In this embodiment, the reciprocating piston 38 of the preferred embodiment of FIGURE 1 is replaced with oscillating arm 78 to which is attached conduit member 80 used to transfer liquid plastic to outlet 83. As rod 78 is oscillated through about 30°, outlet 83 contacts the base material 20 being extruded through orifice 18 thus causing a multiplicity of threads 67 to be bonded thereto. Simultaneously, upon oscillation of rod 78, port 82 of oscillating rod 78 rotates out of alignment with the passageway of liquid plastic and thus acts as a cut-off valve causing the flow of plastic to cease. To insure that the filaments or threads break, a gas flame 84 is located in close proximity to the bonds between base material 20 and filaments 67. Heating rods 76 are located within the die head 10 as illustrated in FIGURE 9. Choke 22 is used to vary the thickness of the base material 20 being extruded through orifice 18 in the same manner as disclosed by applicant's preferred embodiment shown in FIGURE 1.

Manifestly, various modifications in the methods and suggested devices for performing said methods may be employed without departing from the spirit and scope of invention as defined in the subjoined claims.

What is claimed is:

1. An apparatus for producing a ruglike article comprising a base sheet and a superposed pile which comprises:
   (a) a die head for continuously extruding a sheet of plastic material;
   (b) a plurality of filament extrusion orifices proximate the extrusion end of said die head; and
   (c) means for moving said extrusion orifices relative to the plane of said extruding sheet to intermittently position said orifices proximate to and spaced from the surface of said sheet.

2. The apparatus of claim 1 including a filament die head containing said orifices in substantial alignment and wherein said means reciprocates said filament die head in a plane intersecting the plane of said sheet.

3. The apparatus of claim 2 wherein the plane in which said filament die head reciprocates is perpendicular to the plane of said sheet.

4. The apparatus of claim 1 including a plurality of filament dies each being rotatable about an individual axis of rotation, said filament dies containing said extrusion orifices disposed eccentric to the axes of rotation of said filament dies.

5. The apparatus of claim 4 wherein said axes of rotation of said filament dies are in a common plane.

6. The apparatus of claim 5 wherein the common plane of said axes is parallel to the plane of said sheet at the point of extrusion of said sheet.

7. The apparatus of claim 1 including a filament die head containing said extrusion orifice in substantial alignment and wherein said means moves said filament die head through a portion of an arc of a circle.

8. The apparatus of claim 7 including filament severing means proximate the extrusion orifices of said filament die head when said extrusion orifices are spaced from the surface of said sheet.

9. An apparatus for producing a ruglike article comprising a base portion and a superposed pile portion comprising:
   (a) a heated supply chamber for molten plastic;
   (b) a die head for continuously extruding a sheet of plastic material communicating with said supply chamber;
   (c) a plurality of filament extrusion orifices disposed transversely to said extruding sheet proximate the extrusion end of said die head; and
   (d) means for moving said extrusion orifices to position said orifices proximate to and spaced from the surface of said sheet.

10. The apparatus of claim 9 including a filament die head containing said extrusion orifices, and wherein said means reciprocate said filament die head in a plane intersecting the plane of said sheet.

11. The apparatus of claim 9 including a second heated plastic supply chamber communicating with said extrusion orifices.

12. The apparatus of claim 9 including a plurality of filament dies each being rotatable about an individual axis of rotation, said filament dies containing said extrusion orifices disposed eccentric of the axes of rotation of said filament dies.

13. The apparatus of claim 12 wherein said axes of rotation of said filament dies lie in a common plane.

14. The apparatus of claim 9 including choke means between said supply chamber and said die head to regulate plastic flow to said die head.

15. An apparatus for producing ruglike articles comprising a base portion and a superposed pile portion which comprises:
   (a) a die head defining an extrusion slot for extending a sheet of plastic material;
   (b) a plastic supply chamber within said die head communicating with said extrusion slot;
   (c) a filament die proximate the extrusion slot of said die head;
   (d) a plurality of extrusion orifices in said filament die communicating with said supply chamber and coextending with at least a portion of said extrusion slot;

(e) means for moving said filament die alternately toward and away from the plane of said extruding sheet; and
(f) means to cut off the flow of plastic between said supply chamber and said extrusion orifices when said filament die is spaced from said sheet.

16. The apparatus of claim 15 including means to sever said filaments when said filament die is spaced from the plane of said sheet.

References Cited

UNITED STATES PATENTS 2,803,041   8/1957   Hill et al. _____ 18—13
3,382,122   7/1968   Halle _____ 18—13 XR WILLIAM J. STEPHENSON, *Primary Examiner.*

U.S. Cl. X.R.

18—12